(12) United States Patent
Abdalla et al.

(10) Patent No.: US 8,584,702 B2
(45) Date of Patent: Nov. 19, 2013

(54) APPARATUS, SYSTEM, AND METHOD FOR A SELF-VENTING DRAIN VALVE

(75) Inventors: Wassem Abdalla, Quimper (FR); Peter K. Herman, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1292 days.

(21) Appl. No.: 11/936,639

(22) Filed: Nov. 7, 2007

(65) Prior Publication Data
US 2009/0114287 A1 May 7, 2009

(51) Int. Cl.
F16K 24/02 (2006.01)
F02M 37/22 (2006.01)
B67D 3/04 (2006.01)

(52) U.S. Cl.
USPC ............ 137/588; 137/589; 210/248; 222/484

(58) Field of Classification Search
USPC ............ 137/588, 589, 628, 625.12; 222/484; 210/248
See application file for complete search history.

(56) References Cited

U.S. PATENT DOCUMENTS

| 2,933,885 | A | * | 4/1960 | Vago et al. ...................... 60/659 |
| 4,420,392 | A | | 12/1983 | Harris |
| 4,611,627 | A | * | 9/1986 | Eidsvoog et al. ............. 137/588 |
| 4,855,041 | A | | 8/1989 | Church et al. |
| 4,976,285 | A | * | 12/1990 | Church et al. ................ 137/588 |
| 5,117,863 | A | * | 6/1992 | McGarrah ...................... 137/559 |
| 5,273,071 | A | * | 12/1993 | Oberrecht ................ 137/614.06 |
| 5,547,565 | A | | 8/1996 | Biere et al. |
| 5,855,772 | A | | 1/1999 | Miller et al. |
| 5,927,565 | A | * | 7/1999 | Paczonay ....................... 222/484 |
| 6,029,629 | A | * | 2/2000 | Tipton .......................... 123/447 |
| 6,223,791 | B1 | * | 5/2001 | Arsenault et al. ............. 141/291 |
| 6,779,694 | B2 | * | 8/2004 | Young ........................... 222/525 |
| 2003/0189794 | A1 | * | 10/2003 | Kameyama et al. ....... 360/235.8 |
| 2006/0086649 | A1 | | 4/2006 | Wieczorek et al. |

OTHER PUBLICATIONS

International Search Report of PCT/US2008/082855, dated Jan. 26, 2009.
Written Opinion of the International Searching Authority of PCT/US2008/082855, dated Jan. 26, 2009.

* cited by examiner

*Primary Examiner* — Craig Schneider
*Assistant Examiner* — Atif Chaudry
(74) *Attorney, Agent, or Firm* — Hamre, Schumann, Mueller & Larson, P.C.

(57) ABSTRACT

An apparatus, system, and method are disclosed for draining a liquid. An inner drain body is disposed on a container, with an inner liquid outlet in its lower portion, and an air inlet above and at a radial offset from the inner liquid outlet. An outer drain body is disposed around and below the inner drain body, and is adjustably coupled to the inner drain body. An outer liquid outlet is disposed in the outer drain body. A lower seal is disposed below the inner liquid outlet and between the inner drain body and the outer drain body, engaging a lower sealing surface. An upper seal circumscribes the inner liquid outlet and the air inlet, and is disposed between the inner drain body and the outer drain body, engaging an upper sealing surface that extends further beyond the upper seal than the lower sealing surface extends beyond the lower seal.

23 Claims, 5 Drawing Sheets

APPARATUS, SYSTEM, AND METHOD FOR A SELF-VENTING DRAIN VALVE

BACKGROUND OF THE INVENTION

1. Field of the Invention

This invention relates to liquid drain valves and more particularly relates to self-venting drain valves for draining liquids under various pressures.

2. Description of the Related Art

Many applications require that accumulated liquids be drained from a container. For example, a fuel-water separator used with many types of diesel engines removes water from a fuel supply, collecting the water in a container. In order for the fuel-water separator to continue to remove water from the fuel supply, the accumulated water must be drained. To complicate matters, a pump may pressurize the fuel supply while the engine is running, but be inactive while the engine is not running.

Known drainage solutions are often overly complex, involving springs, standpipes, levers, pistons, plungers, and the like. These systems are difficult and expensive to manufacture and maintain. Many drainage solutions are designed to function under specific pressure conditions, and may not allow liquid to drain under other pressures. Drain valves that are designed to drain liquids under pressure often have difficulties draining liquids under atmospheric pressure, developing a vapor-lock. Drain valves that are designed to drain liquids under atmospheric pressure leak or squirt liquid erratically when the liquid is under more than atmospheric pressure.

From the foregoing discussion, it should be apparent that a need exists for an apparatus, system, and method that drain liquids under various pressure conditions. Beneficially, such an apparatus, system, and method would be relatively simple to manufacture and maintain.

SUMMARY OF THE INVENTION

The present invention has been developed in response to the present state of the art, and in particular, in response to the problems and needs in the art that have not yet been fully solved by currently available drain valves. Accordingly, the present invention has been developed to provide an apparatus, system, and method for a self-venting drain valve that overcome many or all of the above-discussed shortcomings in the art.

The apparatus to drain a liquid is provided with a plurality of elements configured to functionally perform the necessary steps of draining a liquid under various pressures. These elements in the described embodiments include an inner drain body, an inner liquid outlet, an air inlet, an outer drain body, an outer liquid outlet, a lower seal, an upper seal, and a fastening means.

The inner drain body, in one embodiment, is disposed on a container. The inner drain body has an inner liquid outlet and an air inlet. The air inlet, in one embodiment, is disposed at a radial offset from the inner liquid outlet, and above the inner liquid outlet. In a further embodiment, the air inlet has a cross-sectional area smaller than a cross-sectional area of the inner liquid outlet. In one embodiment, the cross-sectional area of the air inlet is about less than one fourth of the cross-sectional area of the inner liquid outlet. In another embodiment, the air inlet comprises a water-repelling surface.

The outer drain body is disposed around and below the inner drain body. The outer drain body, in one embodiment, comprises an outer liquid outlet. The outer drain body may be adjustably coupled to the inner drain body. In one embodiment, one or more edges of the outer drain body that contact at least one of the lower seal and the upper seal are rounded. In another embodiment, the inner liquid outlet and the outer liquid outlet are oriented vertically such that the liquid drains along a substantially vertical axis. In one embodiment, at least one of the inner drain body and the outer drain body comprises a metal. The metal may be selected from the group consisting of zinc and aluminum. In another embodiment, at least one of the inner drain body and the outer drain body comprises a polymer.

The lower seal, in one embodiment, is disposed below the inner liquid outlet and between the inner drain body and the outer drain body. In one embodiment, the lower seal engages a lower sealing surface. In one embodiment, the lower seal comprises an O-ring circumscribing a lower portion of the inner drain body, the lower portion extending below the inner liquid outlet. In a further embodiment, the lower seal comprises a face seal.

The upper seal, in one embodiment, circumscribes the inner liquid outlet and the air inlet. In one embodiment, the upper seal is disposed between the inner drain body and the outer drain body. In another embodiment, the upper seal comprises an O-ring circumscribing an upper portion of the inner drain body, the upper portion disposed above at least part of the air inlet. In one embodiment, the upper seal comprises a face seal.

In one embodiment, the fastening means may adjustably couple the outer drain body to the inner drain body. In another embodiment, the fastening means guides the outer drain body such that the lower seal opens before the upper seal opens. In a further embodiment, the fastening means comprises threading on an interior face of the outer drain body and threading on an exterior face of the inner drain body. In another embodiment, the fastening means comprises one or more quarter-turn fasteners.

A system of the present invention is also presented to separate and drain water from a fuel. The system may be embodied by a fuel-water separator and a self-venting drain valve. In particular, the system, in one embodiment, may include a water sensor, a fuel tank, a lift pump, a fuel pump, and/or an internal combustion engine. A method and additional apparatuses are presented that comprise substantially similar elements and steps as disclosed above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to ensure a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
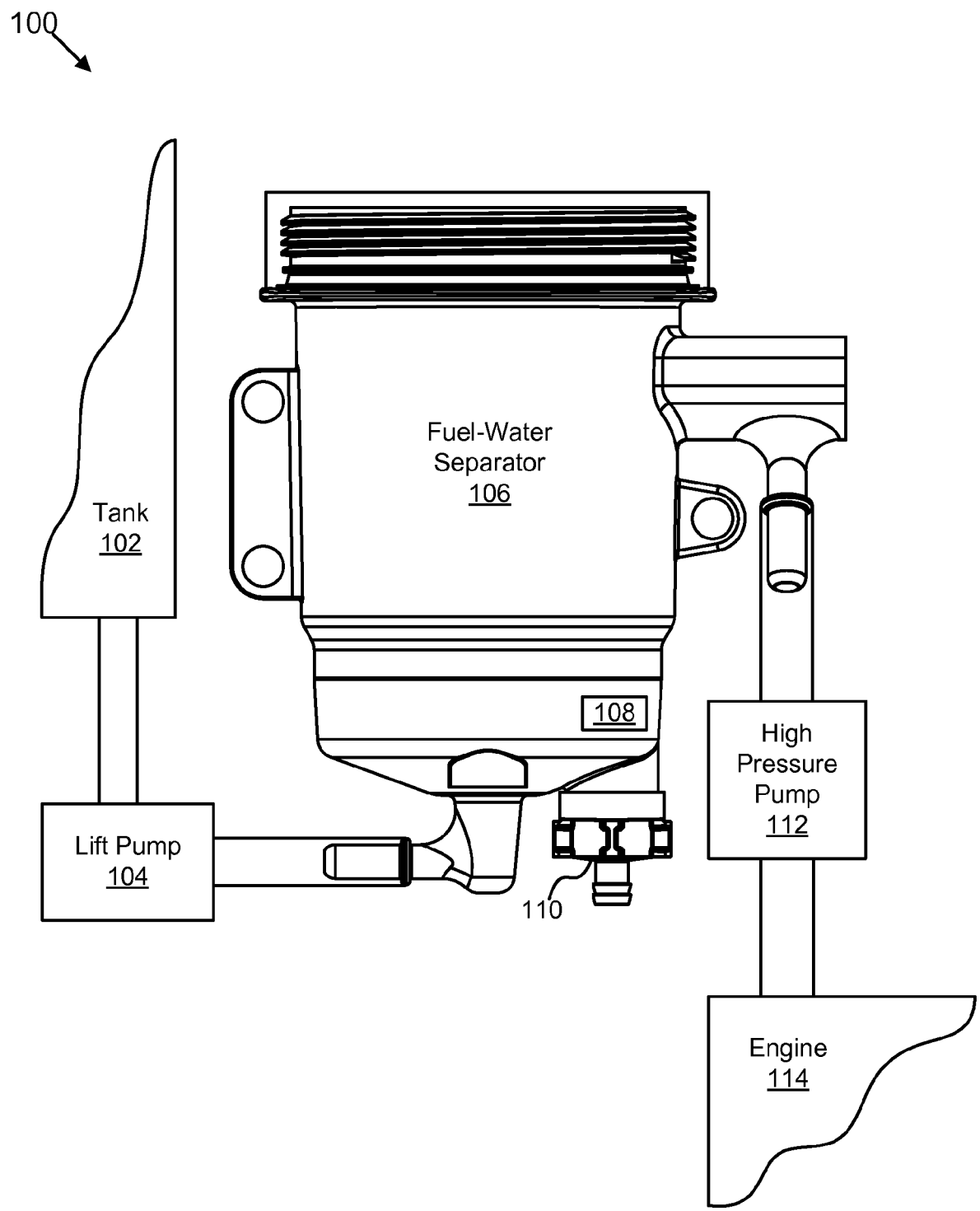
FIG. 1 is a schematic block diagram illustrating one embodiment of a self-venting drainage system in accordance with the present invention.

FIG. 1 depicts a system 100 for draining a liquid such as water from a container, vessel, or the like, such as a fuel-water separator 106. In the illustrated embodiment, the system 100 comprises a tank 102, a lift pump 104, a fuel-water separator 106, a self-venting drain valve 110, a high pressure pump 112, and an engine 114. In view of the present specification, it will be apparent that a self-venting drain valve substantially similar to the self-venting drain valve 110 of FIG. 1 may be used to drain liquids from other containers, vessels, and the like.

In the depicted embodiment, the fuel tank 102 is configured to store and distribute a liquid such as a hydrocarbon based fuel to the system 100. The liquid may comprise a saturated hydrocarbon or alkane based fuel, and may be derived from naturally occurring petroleum or biological material, or may be synthetically created or the like. In the illustrated embodiment, the liquid comprises a fuel such as diesel or biodiesel that is configured for use in the engine 114. The fuel tank 102 may be susceptible to water condensation, which may introduce liquid water into the hydrocarbon based fuel. The water may separate from the fuel, sinking below it, because of a higher density of the water in relation to the hydrocarbon based fuel.

In the illustrated embodiment, the fuel tank 102 is in fluid communication with the lift pump 104. The lift pump 104 transfers the liquid from the fuel tank 102 through the fuel-water separator 106 to the high pressure pump 112. In one embodiment, the lift pump 104 may be configured to pump the liquid through one or more filters (not shown). The one or more filters may be integrated with the fuel tank 102, the lift pump 104, the fuel-water separator 106, and/or the high pressure pump 112, or may be separate from the other members of the system 100, but in fluid communication with them. The lift pump 104 may be a mechanical pump, an electric pump, or another pump capable of pumping liquid from the fuel tank 102 through the system 100 to the high pressure pump 112. The lift pump 104 may be configured to use a diaphragm or the like to pump the fuel. The diaphragm may be actuated electrically, mechanically using a camshaft lobe, or by another means. The lift pump 104, in one embodiment, may comprise means to bleed air from the system 100, such as a manual pumping lever, or means to electrically run the lift pump 104 before the engine 114 is running. In certain embodiments, the tank 102 may be in a position remote from the lift pump 104, and the lift pump 104 may be configured to lift the fuel from the remote position, which may be substantially below or tangentially removed from the lift pump 104.

The fuel-water separator 106 is configured to separate water from the fuel. The water may have been introduced into the fuel as condensation in the tank fuel 102, as described above, or may have been present in the fuel prior to entering the fuel tank 102. The fuel-water separator 106 may use the difference between the densities of the fuel and the water to separate the water from the fuel. The fuel-water separator 106 may separate the water from the fuel such that the water collects in a lower portion of the fuel-water separator 106. In another embodiment, the fuel-water separator 106 comprises one or more fuel filters.

In the depicted embodiment, the fuel-water separator 106 comprises a water sensor 108. The water sensor 108 alerts a user, operator, technician or the like of the presence of water in the fuel-water separator 106. The water sensor 108 may alert the user of the presence of any water, or the water sensor 108 may alert the user after a predetermined amount of water is present. The water sensor 108 may be a magnetic float sensor, a mechanical float sensor, a capacitance or radio frequency (RF) level sensor, an electrical sensor, or another type of sensor capable of detecting the presence of water or a predetermined amount of water or water level. The water sensor 108 may alert the user by triggering a warning light (not shown), sounding a bell, or the like. The warning light may be incorporated into a dashboard, an instrument panel, a steering-wheel, or otherwise disposed such that a user is likely to see it.

The fuel-water separator 106, in the illustrated embodiment, comprises a self-venting drain valve 110. The self-venting drain valve 110 is discussed in greater detail with regard to FIGS. 2A, 2B, 3A, 3B, and 3C. In general, the self-venting drain valve 110 has a fully closed position wherein the self-venting drain valve 110 is substantially sealed, a partially open position wherein a lower seal is broken permitting liquid to exit the self-venting drain valve 110 when under pressure from the lift pump 104, and a fully open position wherein the lower seal and an upper seal are broken permitting air to enter the self-venting drain valve 110 and creating a siphon allowing liquid to exit the self-venting drain valve 110 under atmospheric pressure. In one embodiment, the user may operate the self-venting drain valve 110 to drain a liquid as described in greater detail with regard to FIGS. 5 and 6.

The high pressure pump 112 injects the fuel into the engine 114. The high pressure pump 112 may be a fuel pump such as an inline jerk pump, a distributor pump, or another fuel injector type pump. The high pressure pump 112 receives the fuel at a low pressure and pumps the fuel to the engine 114 at a higher pressure. The high pressure pump 112 pumps the fuel according to an injection timing, delivering a precise amount of fuel to each of a plurality of fuel injectors in the engine 114 based on the injection timing. The high pressure pump 112 is configured to withstand extreme pressures, temperatures, and other engine conditions. The high pressure pump 112 may comprise an oil reservoir or the like to lubricate one or more internal components of the high pressure pump 112. The high pressure pump 112 may comprise one or more plungers, barrels, and the like. In one embodiment, the high pressure pump 112 may comprise a single high-pressure plunger and barrel that distributes the fuel to each cylinder of the engine 114 using a rotating valve assembly or the like. In another embodiment, the high pressure pump 112 comprises a plunger and a barrel for each cylinder of the engine 114.

The engine 114, in the illustrated embodiment, comprises a diesel engine or another internal combustion engine fueled by a hydrocarbon. The engine 114 receives the fuel from the high pressure pump 112. The engine 114 may use compression ignition to generate power from the fuel. The engine 114 may power a vehicle such as an automobile, a motor boat, an airplane, a generator, heavy machinery, or the like.

Figure 2A:
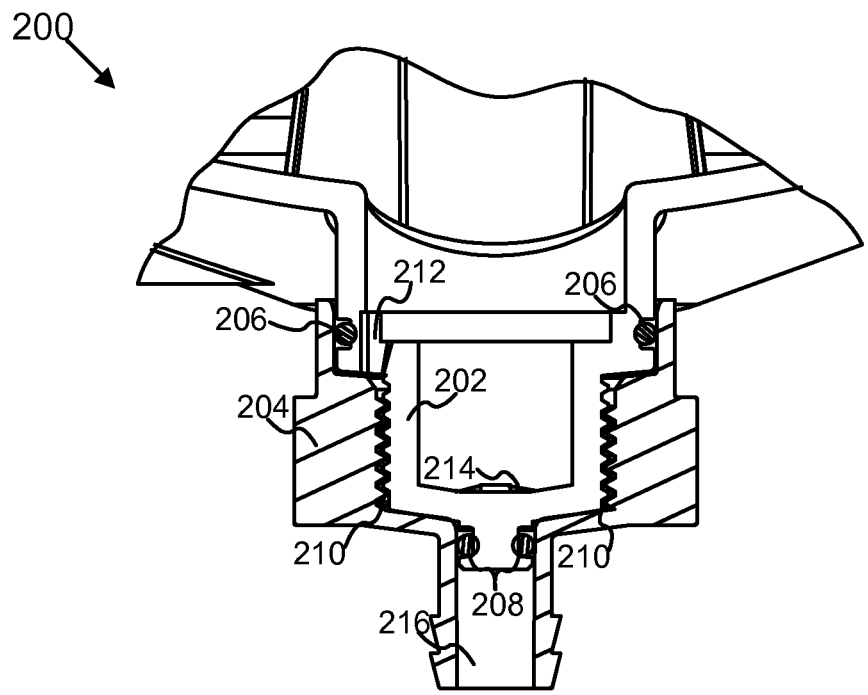
FIG. 2A is a schematic block diagram illustrating one embodiment of a self-venting drain valve in a fully closed position in accordance with the present invention.

FIG. 2A illustrates one embodiment of a self-venting drain valve 200 in a fully closed position. The self-venting drain valve 200 may be substantially similar to the self-venting drain valve 110 of FIG. 1. In the illustrated embodiment, the self-venting drain valve 200 comprises an inner drain body 202 an outer drain body 204, an upper seal 206, a lower seal 208, and one or more fasteners 210.

The inner drain body 202 may be formed on or otherwise coupled to a container, vessel, tank, reservoir or the like such that a user, operator, or technician may drain a liquid from the container or the like. The inner drain body 202 may comprise a synthetic polymer such as nylon or another plastic, or a metal such as zinc, aluminum, or the like. In one embodiment, the inner drain body 202 is formed as a continuous part of a container wall. In another embodiment, the inner drain body 202 is formed separate from the container, but is removably or non-removably coupled to the container using a fastener such as an adhesive, welding, threads and the like. The inner drain body 202 may be die cast, injection molded, or otherwise manufactured. The upper portion of the inner drain body 202, in the depicted embodiment, has a radius chamfer. The radius chamfer improves the flow-rate of the liquid exiting the inner drain body 202, and assists in self-centering the flow of the liquid.

In the illustrated embodiment, the inner drain body 202 is substantially cylindrical and comprises an air inlet 212 and an inner liquid outlet 214. The air inlet 212 comprises an opening, channel, passage, hole or the like that provides fluid communication from the outside of the inner drain body 202 to the inside of the inner drain body 202. In the depicted embodiment, the air inlet 212 is substantially conical, but in other embodiments the air inlet 212 may be cylindrical, rectangular, wedge shaped, or may have another shape. The shape may be chosen to ease manufacturing, to optimize air flow, or for other design considerations. In one embodiment, a surface of the air inlet 212 is water repellant. The surface of the air inlet 212 may become water repellant if it is wetted with fuel. In another embodiment, the inner drain body 202 comprises multiple air inlets that are similar to the air inlet 212. In one embodiment, the air inlet 212 is disposed at least 2 millimeters radially from the inner liquid outlet.

The inner liquid outlet 214 comprises one or more openings, channels, passages, holes or the like that provide fluid communication from the inside of the inner drain body 202 to the outside of the inner drain body 202. The inner liquid outlet 214, in the depicted embodiment, comprises multiple openings such that the lower seal 208 is supported between the openings. The inner liquid outlet 214 may comprise multiple openings in a substantially circular configuration around a central lower seal support, with one or more bars, buttresses, columns, joists, brackets, braces, scaffolds, or other supports disposed between the openings, the supports connecting the lower seal 208 to one or more sidewalls of the inner drain body 202. The central lower seal support extends below the inner liquid outlet 214. In one embodiment, a cross-sectional area of the air inlet 212 or of a total cross-sectional area of multiple air inlets is about less than one fourth of the cross-sectional area of the inner liquid outlet 214.

The outer drain body 204 is adjustably coupled to the inner drain body 202 by the one or more fasteners 210. The outer drain body 204 may comprise a synthetic polymer such as nylon or another plastic, or a metal such as zinc, aluminum, or the like. The outer drain body 204 may be die cast, injection molded, or otherwise manufactured. The outer drain body 204 may comprise the same material as the inner drain body 202, or a different material.

In the depicted embodiment, the outer drain body 204 is substantially cylindrical, and comprises an outer liquid outlet 216. The outer liquid outlet 216 is substantially below the inner liquid outlet 214, such that they are oriented vertically and the liquid drains from the inner liquid outlet 214 to the outer liquid outlet 216 along a vertical axis. The outer drain body 204 has at least three positions relative to the inner drain body 202, a fully closed position, a partially open position, and a fully open position. In one embodiment, the lower edge of the outer liquid outlet 216 is about 25 millimeters below the lower edge of the air inlet 212 when the outer drain body 204 is in the fully closed position. In a further embodiment, the lower edge of the outer liquid outlet 216 is about 30 millimeters below the lower edge of the air inlet 212 when the outer drain body 204 is in the fully open position. In one embodiment, the outer liquid outlet 216 is about between 4 and 8 millimeters wide. The outer liquid outlet 216 may be drafted towards the outlet to conserve the surface tension's suction head to the lowest possible position.

The upper seal 206 is configured to seal the air inlet 212 such that the liquid does not exit the air inlet 212 and external air does not enter the air inlet 212 when the outer drain body 204 is in the fully closed position or the partially open position. The upper seal 206 allows air to enter the air inlet 212 when the outer drain body 204 is in the fully open position. In the depicted embodiment, the upper seal 206 comprises an O-ring type seal that circumscribes an upper portion of the inner drain body 202, sealing the air inlet 212 radially. The upper seal 206 is disposed between the inner drain body 202 and the outer drain body 204 when the outer body 204 is in the fully closed position or the partially open position. In another embodiment, the upper seal 206 comprises a face seal, a multi-phase seal, or another type of seal. In one embodiment, an upper edge of the outer drain body 204 that contacts the upper seal 206 is rounded to prevent damage to the upper seal 206. The portion of the outer drain body 204 that contacts the upper seal 206 comprises an upper sealing surface.

The lower seal 208 is configured to seal the inner liquid outlet 214 such that the liquid does not exit the inner liquid outlet 214 when the outer drain body 204 is in the fully closed position. The lower seal 208 allows the liquid to exit the inner liquid outlet 214 when the outer drain body 204 is in the partially open position or the fully open position. In the depicted embodiment, the lower seal 208 comprises an O-ring type seal that circumscribes a lower portion of the inner drain body 202, sealing the outer liquid outlet 216 from the inner liquid outlet 214 radially. The lower seal 208 is disposed between the inner drain body 202 and the outer drain body 204 when the outer body 204 is in the fully closed position. In another embodiment, the lower seal 208 comprises a face seal, a multi-phase seal, or another type of seal. In one embodiment, an upper edge of the outer liquid outlet 216 that contacts the lower seal 208 is rounded to prevent damage to the lower seal 208. The portion of the outer drain body 204 that contacts the lower seal 206 comprises a lower sealing surface. The lower sealing surface may be shorter than the upper sealing surface such that the lower seal 208 breaks or opens before the upper seal 206 breaks or opens when a user operates or adjusts the outer drain body 204.

The one or more fasteners 210 couple the outer drain body 204 to the inner drain body 202 such that a user, operator, or the like can move the outer drain body 204 between the fully closed position, the partially open position, and the fully open position. In the illustrated embodiment, the one or more fasteners 210 comprise threading on an exterior face of the inner drain body 202 and corresponding threading on an interior face of the outer drain body 204, such that the inner drain body 202 and the outer drain body 204 threadably engage each other. The threading may comprise standard threads, buttress threads, acme threads, or another thread type. In another embodiment, the one or more fasteners 210 comprise one or more quarter-turn fasteners, or other multi-phase fasteners.

Figure 2B:
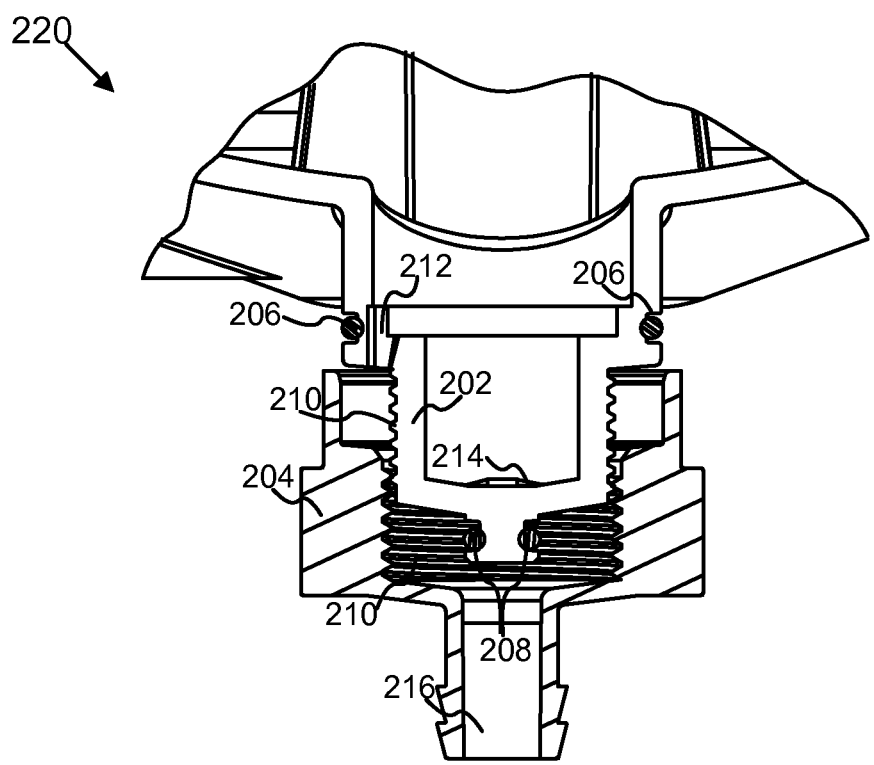
FIG. 2B is a schematic block diagram illustrating one embodiment of a self-venting drain valve in a fully open position in accordance with the present invention.

FIG. 2B illustrates one embodiment of a self-venting drain valve 220 in a fully open position. The self-venting drain valve 220 may be substantially similar to the self-venting drain valve 110 of FIG. 1, and is substantially identical to the self-venting drain valve 200 of FIG. 2A, but is in a fully open position. In the depicted embodiment, a user, operator, or the like has twisted the outer drain body 204 from the fully closed position depicted in FIG. 2A, through the partially open position, to the fully open position. As the user twists the outer drain body 204 from the fully closed position, the lower seal 208 breaks, providing fluid communication from the inner liquid outlet 214 to the outer liquid outlet 216 without breaking the upper seal 206.

If the liquid is under greater than atmospheric pressure, the liquid may drain through the inner liquid outlet 214 and out of the outer liquid outlet 216. If the liquid is under atmospheric pressure, surface pressure may prevent the liquid from exiting the inner liquid outlet 214 and/or the outer liquid outlet 216, creating a vapor-lock, vacuum, or the like. As the user twists the outer drain body 204 from the partially open position to the fully open position, the upper seal 206 breaks, allowing ambient air to enter the air inlet 212, breaking the surface tension, creating a siphon, and allowing the liquid to exit through the inner liquid outlet 214 and the outer liquid outlet 216. In one embodiment, the one or more fasteners 210 are configured to let an amount of liquid that falls out of the air inlet 212 to pass through the one or more fasteners 210 and out of the outer liquid outlet 216.

Figures 3A, 3B, 3C:
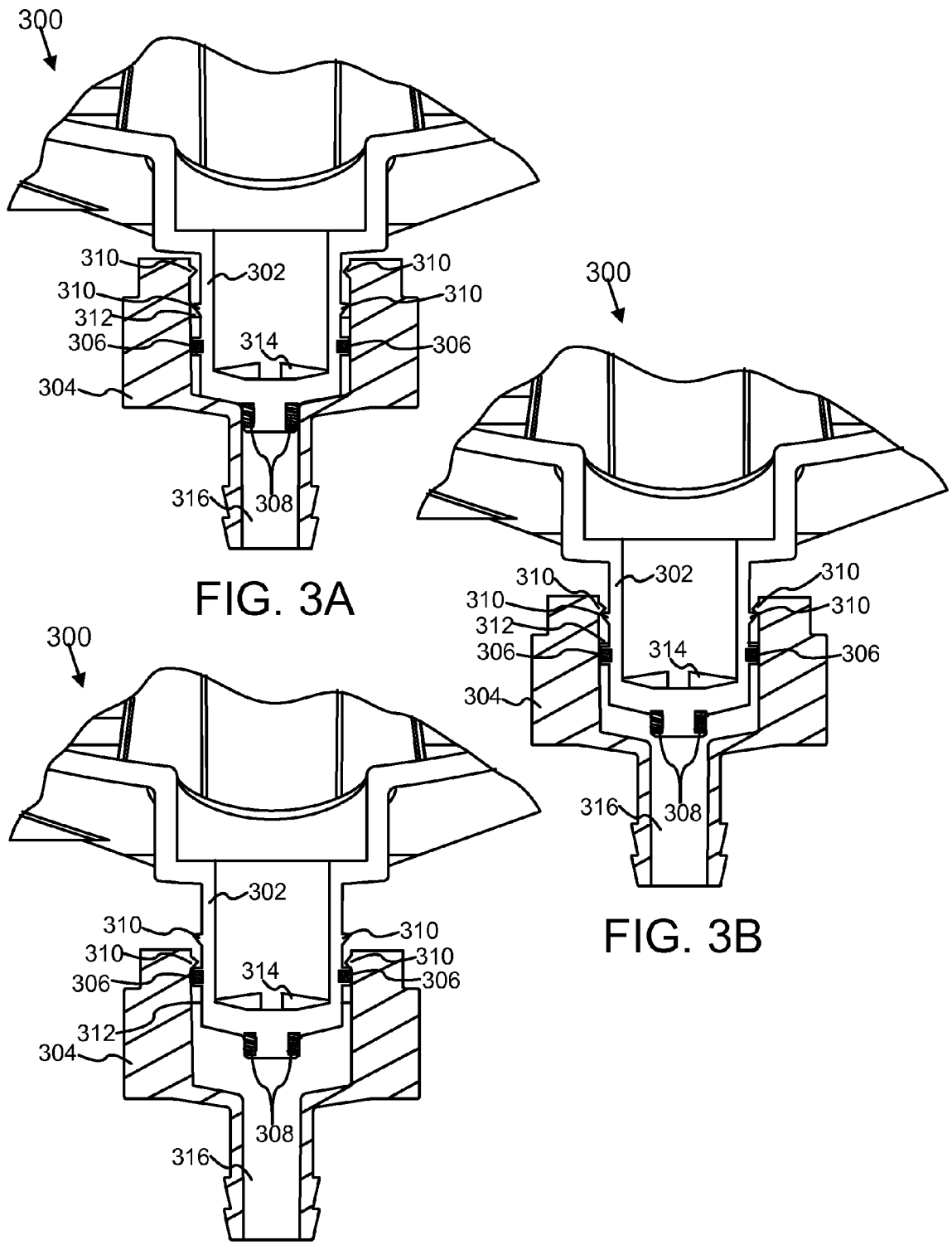
FIG. 3A is a schematic block diagram illustrating one embodiment of a self-venting drain valve in a fully closed position in accordance with the present invention.
FIG. 3B is a schematic block diagram illustrating one embodiment of a self-venting drain valve in a partially open position in accordance with the present invention.
FIG. 3C is a schematic block diagram illustrating one embodiment of a self-venting drain valve in a fully open position in accordance with the present invention.

FIG. 3A illustrates one embodiment of a self-venting drain valve 300 in a fully closed position. The self-venting drain valve 300 may be substantially similar to the self-venting drain valve 110 of FIG. 1. In the illustrated embodiment, the self-venting drain valve 300 comprises an inner drain body 302 an outer drain body 304, an upper seal 306, a lower seal 308, and one or more fasteners 310.

The inner drain body 302 comprises an inner liquid outlet 314. The inner drain body 302 and the inner liquid outlet 314 may be wider than the inner drain body 202 and the inner liquid outlet 214 of FIGS. 2A and 2B, such that the inner liquid outlet 314 may also act as an air inlet when the outer drain body 304 is in a fully open position. In another embodiment, the inner drain body 302 comprises a separate air inlet (not shown) disposed below the upper seal 306.

The outer drain body 304 comprises an outer liquid outlet 316 and one or more outer body gaps 312. The outer liquid outlet 316 is substantially similar to the outer liquid outlet 216 of FIGS. 2A and 2B. The one or more outer body gaps 312 are configured to be positioned above the upper seal 306 when the outer drain body 304 is in the fully closed position or the partially open position, and to be positioned below the upper seal 306 when the outer drain body 304 is in the fully open position. When the outer drain body 304 is in the fully open position, air may pass through the one or more outer body gaps 312 and into an air inlet (not shown) or the inner liquid outlet 314 to break surface tension and allow liquid to exit the inner liquid outlet 314, even when the liquid is under atmospheric pressure.

The upper seal 306 and the lower seal 308 are substantially similar to the upper seal 206 and the lower seal 208 of FIGS. 2A and 2B. In the depicted embodiment, the lower seal 208 also comprises a fastener, such that the pressure of the lower seal 208 against the outer liquid outlet 316 holds the outer drain body 304 in the fully closed position until the user pulls on the outer drain body 304, moving it from the fully closed position to the partially open position. The one or more fasteners 310, in the illustrated embodiment, comprise one or more opposing rims, ledges, dimples, channels, and the like configured to engage each other and guide the outer drain body 204 from the fully closed position, to the partially open position, to the fully open position, and back to the fully closed position.

FIG. 3B illustrates one embodiment of a self-venting drain valve 300 in a partially open position. In the depicted embodiment, the lower seal 308 is not in contact with the outer liquid outlet 316, allowing the liquid to flow through the inner liquid outlet 314 and through the outer liquid outlet 316, exiting the self-venting drain valve 300. If the liquid is not under greater than atmospheric pressure, the surface tension of the liquid may prevent it from exiting the outer liquid outlet 316 when the outer liquid body 304 is in the partially open position, because the one or more outer body gaps 312 are above the upper seal 306. The one or more fasteners 310 are engaged, holding the outer drain body 304 in the partially open position.

FIG. 3C illustrates one embodiment of a self-venting drain valve 300 in a fully open position. The one or more fasteners 310, in the depicted embodiment, are in the fully open position. In one embodiment, the one or more fasteners 310 comprise one or more quarter-turn fasteners or the like. When the outer drain body 304 is rotated about a quarter turn, or ninety degrees, one or more gaps or channels in the one or more fasteners 310 allow the outer drain body 304 to move downward until at least one of the one or more fasteners 310 engages the upper seal 306, or engages another of the one or more fasteners 310. In another embodiment, the one or more fasteners 310 are configured to bend or otherwise give way such that the one or more fasteners 310 may be pulled over each other, bringing at least one of the one or more fasteners 310 into contact with the upper seal 306 or another of the one or more fasteners 310. The width of the one or more outer body gaps 312 and the distance between them may affect the degree to which the one or more fasteners 310 can bend. When the outer drain body 304 is in the fully open position, the one or more outer body gaps 312 are positioned below the upper seal 306, providing fluid communication between ambient air and the inner liquid outlet 314, or between the ambient air and an air inlet (not shown). As the air enters the inner drain body 302, the surface tension of the liquid is broken, allowing a siphon to form and the liquid to drain under atmospheric pressure or greater than atmospheric pressure.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
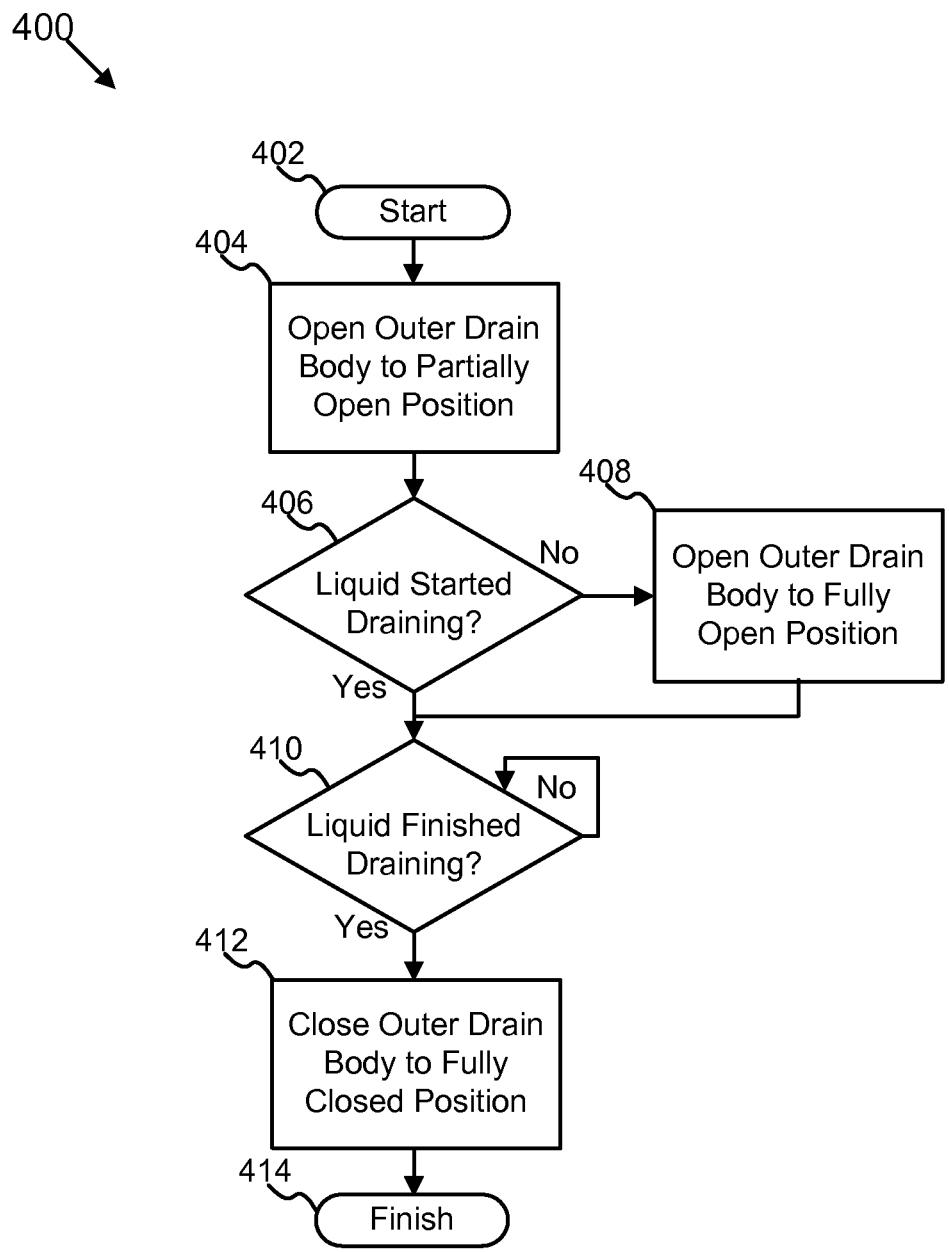
FIG. 4 is a schematic flow chart diagram illustrating one embodiment of a liquid draining method in accordance with the present invention.

FIG. 4 is a schematic flow chart diagram illustrating one embodiment of a liquid draining method 400. The method 400 starts 402. A user, operator, technician, or the like opens 404 the outer drain body 204 to the partially open position, breaking the lower seal 208. The user may open 404 the outer drain body 204 by twisting it, by rotating it a quarter turn and pulling it downward, by pulling it downward, or by other steps, depending on the fasteners used. The user detects 406 whether a liquid is draining through the outer liquid outlet 216 or not. If the liquid is not draining, the user opens 408 the outer drain body 204 to the fully open position, breaking the upper seal 206. If the liquid is draining, the user waits 410 until the liquid is finished draining. In fuel-water separator applications, the user detects 410 when water has substantially finished draining and fuel is predominantly draining. In other applications, the user may wait 410 until the liquid stops draining, or until a predetermined amount of liquid has drained. The user closes 412 the outer drain body 204, returning it to the fully closed position. The method 400 finishes 414.

Figure 5:
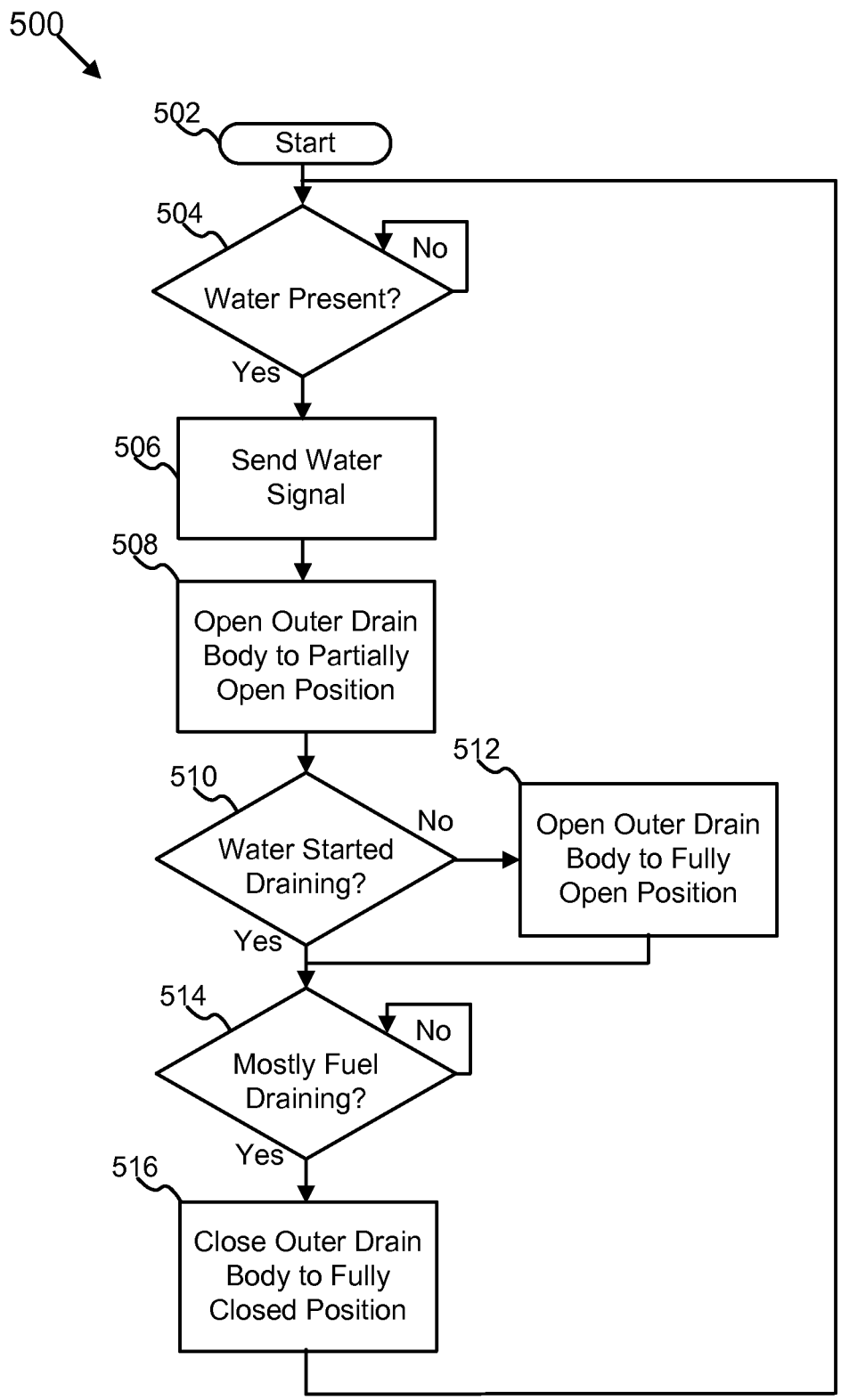
FIG. 5 is a schematic flow chart diagram illustrating one embodiment of a liquid draining method in accordance with the present invention.

FIG. 5 is a schematic flow chart diagram illustrating one embodiment of a liquid draining method 500. The method 500 starts 502. The water sensor 108 detects 504 whether there is water present in the fuel-water separator 106. If the water sensor 108 detects 504 water in the fuel-water separator 106, the water sensor 108 sends 506 a water present signal to a user, operator, technician, or the like. The water present signal may be a visual signal such as a light, an auditory signal such as a bell, or another type of signal. In response to the water present signal, the user opens 508 the outer drain body 204 to the partially open position, breaking the lower seal 208. The user may place a container beneath the outer liquid outlet 216 to hold the water that is drained. The user detects 510 whether or not the water is draining through the outer liquid outlet 216. If the water is not draining, the user opens 512 the outer drain body 204 to the fully open position, breaking the upper seal 206. If the water is draining, the user waits 514 until the water has substantially finished draining and fuel is predominantly draining. The user closes 516 the outer drain body 204, returning it to the fully closed position. If the user neglects to return the outer drain body 204 to the fully closed position, the fuel will continue to drain, reducing performance of the engine 114, preventing the lift pump 104 from building pressure, and wasting the fuel. The method 400 returns to the water detection step 504.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fuel-water separator for separating water from fuel and draining the water, the fuel-water separator comprising:
    a container configured to be in fluid communication with a fuel tank, the container configured to receive fuel distributed from the fuel tank and contain the fuel;
    a self-venting drain apparatus in fluid communication with the container, the self-venting drain apparatus including:
        an inner drain body disposed on the container;
        an inner liquid outlet in a lower portion of the inner drain body;
        an air inlet disposed at a radial offset from the inner liquid outlet and above the inner liquid outlet, the air inlet having a cross-sectional area smaller than a cross-sectional area of the inner liquid outlet;
        an outer drain body disposed around and below the inner drain body, the outer drain body adjustably coupled to the inner drain body;
        an outer liquid outlet in the outer drain body, the outer liquid outlet disposed substantially below the inner liquid outlet;
        a lower seal disposed below the inner liquid outlet and between the inner drain body and the outer drain body, the lower seal engaging a lower sealing surface; and
        an upper seal circumscribing the inner liquid outlet and the air inlet, the upper seal disposed between the inner drain body and the outer drain body, the upper seal engaging an upper sealing surface that extends further beyond the upper seal than the lower sealing surface extends beyond the lower seal,
    the self-venting drain apparatus being arranged in connection with the container so as to include a fully closed position, a partially open position configured to allow draining the water separated from the fuel in the container under pressure from a pump, and a fully open position to allow venting air through the air inlet for draining the water separated from the fuel in the container under atmospheric pressure.

2. The fuel-water separator of claim 1, further comprising a fastening means that adjustably couples the outer drain body to the inner drain body.

3. The fuel-water separator of claim 2, wherein the fastening means comprises threading on an interior face of the outer drain body and threading on an exterior face of the inner drain body.

4. The fuel-water separator of claim 2, wherein the fastening means comprises a quarter-turn fastener.

5. The fuel-water separator of claim 1, wherein the lower seal comprises an O-ring circumscribing a lower portion of the inner drain body, the lower portion of the inner drain body, the lower portion extending below the inner liquid outlet.

6. The fuel-water separator of claim 1, wherein the upper seal comprises an O-ring circumscribing an upper portion of the inner drain body.

7. The fuel-water separator of claim 1, wherein the lower seal comprises a face seal.

8. The fuel-water separator of claim 1, wherein the cross-sectional area of the air inlet is about less than one fourth of the cross-sectional area of the inner liquid outlet.

9. The fuel-water separator of claim 1, wherein an inner facing edge of the outer drain body is rounded.

10. The fuel-water separator of claim 1, wherein the inner liquid outlet and the outer liquid outlet are oriented vertically such that the liquid drains along a substantially vertical axis.

11. The fuel-water separator of claim 1, wherein an inner surface of the air inlet is water-repelling.

12. The fuel-water separator of claim 1, wherein at least one of the inner drain body and the outer drain body comprises a metal.

13. The fuel-water separator of claim 12 wherein the metal is selected from the group consisting of zinc and aluminum.

14. The fuel-water separator of claim 1, wherein at least one of the inner drain body and the outer drain body comprises a polymer.

15. A system to separate and drain water from a fuel, the system comprising:
a fuel-water separator;
a self-venting drain valve comprising:
an inner drain body disposed on the fuel-water separator;
an inner liquid outlet in a lower portion of the inner drain body;
an air inlet disposed at a radial offset from the inner liquid outlet and above the inner liquid outlet, the air inlet having a cross-sectional area smaller than a cross-sectional area of the inner liquid outlet;
an outer drain body disposed around and below the inner drain body, the outer drain body adjustably coupled to the inner drain body;
an outer liquid outlet in the outer drain body, the outer liquid outlet disposed substantially below the inner liquid outlet;
a lower seal disposed below the inner liquid outlet and between the inner drain body and the outer drain body, the lower seal engaging a lower sealing surface; and
an upper seal circumscribing the inner liquid outlet and the air inlet, the upper seal disposed between the inner drain body and the outer drain body, the upper seal engaging an upper sealing surface that extends further beyond the upper seal than the lower sealing surface extends beyond the lower seal,
the self-venting drain valve being arranged in connection with the fuel-water separator so as to include a fully closed position, a partially open position configured to allow draining the water in the fuel-water separator under pressure from a pump, and a fully open position to allow venting air through the air inlet for draining the water in the fuel-water separator under atmospheric pressure.

16. The system of claim 15, further comprising a water sensor that determines when a predetermined amount of water is present in the fuel-water separator and to send an alert signal in response to the presence of the predetermined amount of water.

17. The system of claim 15, further comprising a fuel tank that stores a hydrocarbon based fuel, and further comprising a lift pump that pumps the hydrocarbon based fuel from the fuel tank to the fuel-water separator.

18. The system of claim 15, further comprising a fuel pump that pumps the hydrocarbon based fuel from the fuel-water separator to an internal combustion engine.

19. The system of claim 18, wherein the hydrocarbon based fuel comprises a diesel fuel and the internal combustion engine comprises a compression ignition engine.

20. A self-venting drain valve to drain a liquid from a fuel-water separator, the self-venting drain valve comprising:
a substantially cylindrical inner drain body formed in a container wall of the fuel-water separator;
an inner liquid outlet in a lower portion of the inner drain body;
an air inlet disposed at a radial offset from the inner liquid outlet and above the inner liquid outlet, the air inlet having a cross-sectional area smaller than a cross-sectional area of the inner liquid outlet;
a substantially cylindrical outer drain body disposed around and below the inner drain body, the outer drain body threadably engaging the inner drain body;
an outer liquid outlet in the outer drain body, the outer liquid outlet disposed substantially below the inner liquid outlet;
threading disposed on an exterior portion of the inner drain body and corresponding threading disposed on an interior portion of the outer drain body, the threading configured to adjustably couple the outer drain body to the inner drain body;
a lower O-ring seal circumscribing a portion of the inner drain body extending below the inner liquid outlet, the lower O-ring seal engaging a lower sealing surface disposed on an inner face of the outer liquid outlet; and
an upper O-ring seal circumscribing a portion of the inner drain body above at least a portion of the air inlet, the upper O-ring seal engaging an upper sealing surface disposed on an inner face of the outer drain body, the upper sealing surface extending further beyond the upper O-ring seal than the lower sealing surface extends beyond the lower O-ring seal,
the self-venting drain valve being arranged in connection with the container wall so as to include a fully closed position, a partially open position to allow draining the liquid under pressure from a pump, and a fully open position to allow venting air through the air inlet for draining the liquid under atmospheric pressure.

21. The self-venting drain valve of claim 20, wherein the outer drain body is adjustable such that a lower edge of the outer liquid outlet ranges from about 25 millimeters to about 30 millimeters below a lower edge of the air inlet.

22. The self-venting drain valve of claim 20, wherein the air inlet is disposed at least 2 millimeters radially from the inner liquid outlet.

23. The self-venting drain valve of claim 20, wherein the outer liquid outlet is about between 4 and 8 millimeters wide.

\* \* \* \* \*

UNITED STATES PATENT AND TRADEMARK OFFICE
CERTIFICATE OF CORRECTION

| | | |
|---|---|---|
| PATENT NO. | : 8,584,702 B2 | Page 1 of 1 |
| APPLICATION NO. | : 11/936639 | |
| DATED | : November 19, 2013 | |
| INVENTOR(S) | : Abdalla et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1396 days.

Signed and Sealed this
Twenty-fourth Day of March, 2015

Michelle K. Lee
*Director of the United States Patent and Trademark Office*